UNITED STATES PATENT OFFICE.

HENRY AUSTIN ROGERS, OF PAGOSA JUNCTION, COLORADO.

AQUARIUM ATTACHMENT.

1,055,082.  Specification of Letters Patent.  Patented Mar. 4, 1913.

Application filed March 30, 1912. Serial No. 687,392.

*To all whom it may concern:*

Be it known that I, HENRY A. ROGERS, a citizen of the United States, and a resident of Pagosa Junction, in the county of Archuleta and State of Colorado, have invented a new and Improved Aquarium Attachment, of which the following is a full, clear, and exact description.

My invention relates to aquarium attachments, and it has for its object to provide an improved, simple and convenient means for supplying the aquarium with air, and for establishing a circulation of water therein which may be readily removed from the aquarium tank, and be cleaned.

Additional objects of the invention will appear in the following complete specification, in which the preferred form of my invention is disclosed.

In the drawings similar characters of reference indicate corresponding parts in all the views, in which—

Figure 1 is a sectional elevation showing an aquarium tank supplied with my attachment; Fig. 2 is a perspective view of the base member with its collar for supporting the vertical tube; Fig. 3 is a perspective view showing the plug which is inserted in the upper terminal of the vertical tube; and Fig. 4 is a plan view of the filter containing the filter medium, the filter medium being removed showing a portion of the filter to show the construction of the latter.

By referring to the drawings it will be seen that an aquarium tank 5 is provided on the bottom of which the base member 6 is disposed, this base member 6 having an upwardly projecting collar 7, on which is mounted the vertical tube 8, this vertical tube 8 having a lateral opening 9 therethrough, near the collar 7, affording communication between the water in the tank 5, and the interior of the tube 8. A plug 10 is inserted in the upper end of the vertical tube 8, this plug 10 having a flange 11 which rests against the upper terminal of the said tube. There are two conduits in the plug 10, the conduit 12 extending through the said plug, from its upper to its lower face, the other conduit 13, also extending through the plug 10, from its upper face to a distance from its lower face. The bottom of the conduit 13 communicates with the conduit 12 by the passage 10ª in the plug 10. A bent tube 14 is provided, one terminal of which is inserted in the plug 10 at the conduit 13, this tube 14 permitting of the introduction of air into the vertical tube 8, through the conduit 13. A bent tube 15 is also provided, one terminal of which is disposed in the conduit 12, the other terminal being disposed over the center of a filter 16, which is supported on a bracket 17, mounted on the side of the tank 5. There are orifices 18 in the bottom of the filter 16, near its periphery, sand, or another filtering medium being disposed in the filter 16.

In the operation of the device air is forced by a pump, or any other suitable means, into the conduit 13, through the bent tube 14, the air passing through the passage 10ª to the conduit 12, and mixing with the water in the conduit 12, the air escaping in bubbles through the conduit 12, and the bent tube 15, carrying with it volumes of water between the bubbles of air, the said bubbles of air and volumes of water being discharged from the tube 15 above the filter 16, the water being returned to the motor in the aquarium through the filter, the filtering medium 19 and the orifices 18. In this way a slow and even circulation of water in the aquarium tank is obtained, while the water is enriched to support life in the aquarium by the air which is introduced through the bent tube 14.

It will be seen that the members of my device are so constructed that they may be readily removed without disturbing the contents of the tank. When it is desired to remove the attachment the bent tubes 14 and 15 may readily be removed from the plug 10, and the plug 10 may also be removed, either alone or with the vertical tube 8. The filter 16 may also be removed by means of the brackets 17 which are mounted at the side of the tank 5.

The attachment may be constructed at very little expense. Should one of the members be broken or damaged in any way it may be replaced without the necessity of purchasing a complete attachment.

Having thus described my invention I claim as new and desire to secure by Letters Patent:

1. In an aquarium attachment, a base member having an upwardly projecting collar, a tube having a lateral opening detachably mounted at one terminal on the collar, a removable plug disposed in the other terminal of the tube, with two conduits leading to the interior of the tube, a second tube connected with one of the conduits in the H. A. ROGERS.
AQUARIUM ATTACHMENT.
APPLICATION FILED MAR. 30, 1912.
1,055,082.
Patented Mar. 4, 1913.
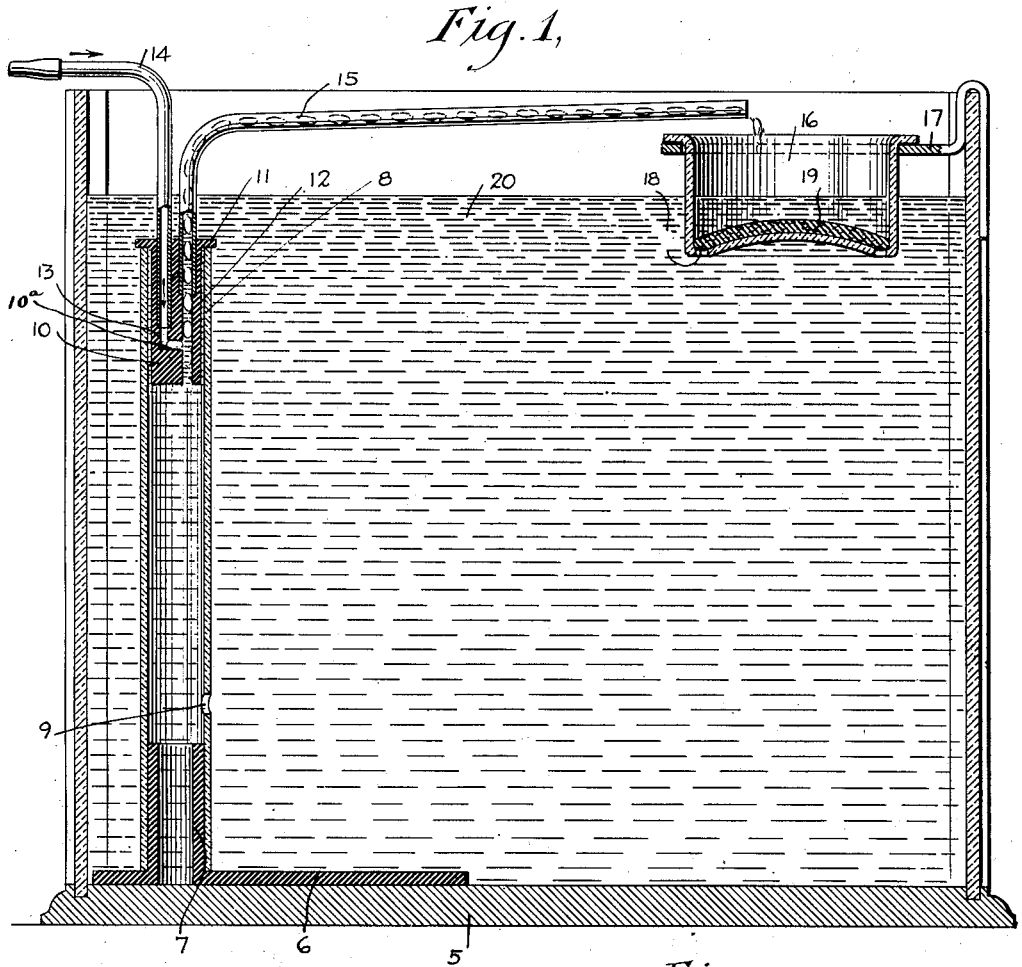
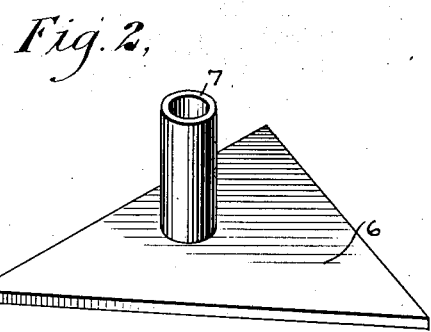
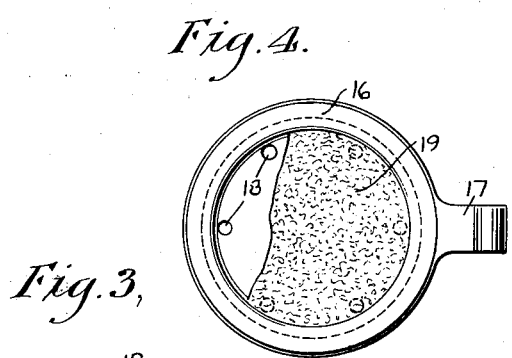
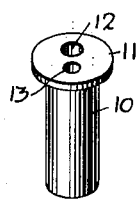
WITNESSES
Edward Thorpe
E. B. Marshall
INVENTOR
Henry A. Rogers
BY
ATTORNEYS